(12) United States Patent
Sawabe

(10) Patent No.: US 8,431,861 B2
(45) Date of Patent: Apr. 30, 2013

(54) HEIGHT POSITION DETECTING APPARATUS AND HEIGHT POSITION DETECTING METHOD

(75) Inventor: Taiki Sawabe, Ota-ku (JP)

(73) Assignee: Disco Corporation, Tokyo (JP)

( * ) Notice: Subject to any disclaimer, the term of this patent is extended or adjusted under 35 U.S.C. 154(b) by 866 days.

(21) Appl. No.: 12/535,336

(22) Filed: Aug. 4, 2009

(65) Prior Publication Data

US 2010/0044359 A1 Feb. 25, 2010

(30) Foreign Application Priority Data

Aug. 22, 2008 (JP) ................................. 2008-214426

(51) Int. Cl.
*B23K 26/02* (2006.01)

(52) U.S. Cl.
USPC .................................................... 219/121.83

(58) Field of Classification Search ............... 219/121.83
See application file for complete search history.

(56) References Cited

U.S. PATENT DOCUMENTS

| 7,710,582 B2 * | 5/2010 | Koga et al. | 356/600 |
| 7,715,025 B2 * | 5/2010 | Iwamoto | 356/614 |
| 2006/0000812 A1 * | 1/2006 | Weber et al. | 219/121.61 |

FOREIGN PATENT DOCUMENTS

| JP | B2 3408805 | 5/2003 |
| JP | A 2007-152355 | 6/2007 |

* cited by examiner

*Primary Examiner* — David Vu
*Assistant Examiner* — Brandon Fox
(74) *Attorney, Agent, or Firm* — Greer, Burns & Crain, Ltd.

(57) ABSTRACT

A laser beam having an annular spot shape with which a workpiece is irradiated is reflected on an upper surface and a lower surface of the workpiece. The reflected light having the annular spot shape which is reflected on the lower surface of the workpiece is intercepted by a pinhole mask, whereas the reflected light having the annular spot shape which is reflected on the upper surface of the workpiece is permitted to pass through the pinhole mask, and the intensity of light received is detected based on the latter reflected light. Therefore, the height position of the upper surface of a workpiece can be detected even where the workpiece is transmissive to visible rays. In this case, with regard to the reflected light having the annular spot shape which is reflected on the upper surface of the workpiece, the intensity of the light after diffusion by a laser beam diffusing unit is detected by a photodetector having a detecting surface with a predetermined area. This makes it possible to assuredly and accurately detect the upper surface height position of the workpiece, even in the presence of scattering of the annular spot shape.

5 Claims, 14 Drawing Sheets

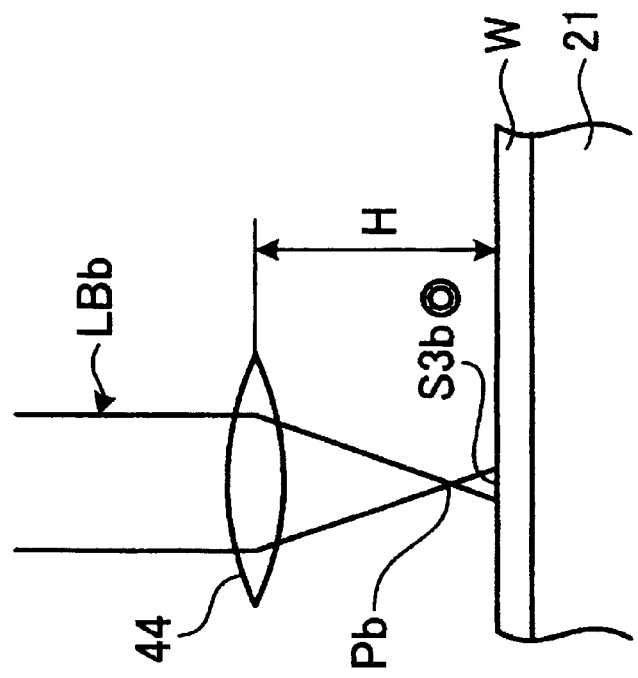
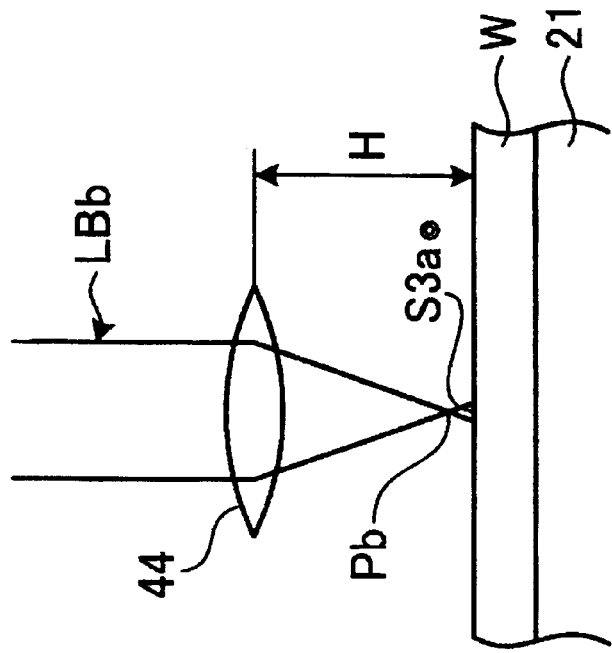

HEIGHT POSITION DETECTING APPARATUS AND HEIGHT POSITION DETECTING METHOD

BACKGROUND OF THE INVENTION

1. Field of the Invention

The present invention relates to a height position detecting apparatus and a height position detecting method for detecting, by use of a laser beam, the height position of an upper surface of a workpiece held on holding means provided in a processing system.

2. Description of the Related Art

In semiconductor device manufacturing processes, a plurality of regions are demarcated by planned dividing lines called streets which are arranged in a grid pattern on a surface of a roughly circular disk-shaped semiconductor wafer, and devices such as ICs and LSIs are formed in the thus demarcated regions. Then, the semiconductor wafer is cut along the streets, whereby the regions with the devices formed therein are divided to produce the individual devices. Besides, an optical device wafer having a gallium nitride compound semiconductor and the like layered on a surface of a sapphire substrate is also cut along streets to divide the wafer into individual optical devices such as light emitting diodes and laser diodes, which are put to wide use in electronic apparatuses.

As a method for dividing the above-mentioned semiconductor wafer or optical device wafer or the like along the streets, a laser beam processing method has been tried in which a pulsed laser beam capable of being transmitted through the wafer is used to irradiate the wafer therewith in the condition where the converging point of the laser beam is adjusted to the inside of the region to be divided. In the dividing method using the laser beam processing method, the pulsed laser beam having such a wavelength as to be transmitted through the wafer, for example, a wavelength of 1064 nm is used to irradiate the wafer therewith from one side of the wafer while adjusting the converging point of the laser beam to the inside of the wafer, whereby an altered layer is continuously formed in the inside of the wafer along the streets, and an external force is exerted on the wafer along the streets where the strength of the wafer is lowered due to the formation of the altered layer, thereby dividing the wafer (see, for example, Japanese Patent No. 3408805).

However, a plate-like workpiece such as a semiconductor wafer has undulation, and, when the thickness of the workpiece varies, the altered layer cannot be formed uniformly at a predetermined depth position upon irradiation with the laser beam, due to a problem relating to refractive index. In order to form the altered layer uniformly at a predetermined depth position in the inside of the workpiece such as a semiconductor wafer, therefore, it is necessary to preliminarily detect the ruggedness of the region (street portions) to be irradiated with the laser beam, and to perform the laser beam processing while operating laser beam irradiation means in the manner of following up to the ruggedness.

Examples of proposals made for solving such a problem include the one described in Japanese Patent Laid-open No. 2007-152355. According to Japanese Patent Laid-open No. 2007-152355, height position detection means is used by which a surface of a workpiece held on a chuck table is irradiated with a visible laser beam and the height position of the surface (upper surface) of the workpiece is detected based on the amount of light corresponding to the area of reflection on the surface of the workpiece.

In the height position detection means described in Japanese Patent Laid-open No. 2007-152355, in the case where the wafer as workpiece is formed of silicon, the laser beam with a wavelength for detection (in Japanese Patent Laid-open No. 2007-152355, 635 nm) is not transmitted through the workpiece and, therefore, the amount of light corresponding to the reflection area on the upper surface of the workpiece can be measured accurately. In the case where the workpiece is formed of sapphire or quartz or the like which is transmissive to the laser beam with a wavelength of 635 nm, however, the laser beam for detection is transmitted through the workpiece and reflected also on the lower surface of the workpiece, making it impossible to measure only the light reflected on the upper surface of the workpiece. Therefore, by the detection system using the height position detection means disclosed in Japanese Patent Laid-open No. 2007-152355, it is impossible to detect the height position of the upper surface of a workpiece formed of a material which is transmissive to visible rays, such as sapphire and quartz.

SUMMARY OF THE INVENTION

Accordingly, it is an object of the present invention to provide a height position detecting apparatus and a height position detecting method by which the height position of an upper surface of a workpiece can be detected assuredly and accurately even where the workpiece is formed of a material which is transmissive to visible rays, such as sapphire and quartz.

In accordance with an aspect of the present invention, there is provided an apparatus for detecting a height position of an upper surface of a workpiece held on holding means, comprising: means for oscillating a laser beam; means for forming a spot shape of the laser beam oscillated by the laser beam oscillating means into an annular shape; a beam splitter for guiding into a first path the laser beam with the annular spot shape formed to be annular by the annular spot forming means; a condenser for condensing the laser beam guided into the first path so as to irradiate the workpiece held on the holding means with the condensed laser beam; a pinhole mask disposed in a second path into which the laser beam reflected on the workpiece held on the holding means is dividedly guided by the beam splitter; means for diffusing the laser beam, the diffusing means disposed on the second path at a position on a downstream side relative to the pinhole mask; detection means having a detecting surface with a predetermined area for detecting the intensity of the laser beam diffused by the laser beam diffusing means, the detection means disposed at a substantially central position of the annular spot of the laser beam; and control means for calculating the height position of the upper surface of the workpiece held on the holding means, based on the intensity of the reflected light detected by the detection means.

Preferably, the annular spot forming means includes a pair of conical lenses arranged in series with each other at a predetermined interval along an optical path of the laser beam.

In accordance with another aspect of the present invention, there is provided a method of detecting a height position of an upper surface of a workpiece held on holding means, the detection being performed by use of a laser beam, the method comprising the steps of: oscillating a laser beam; forming a spot shape of the oscillated laser beam into an annular shape; guiding the laser beam with the spot shape formed to be annular into a first path; condensing the laser beam guided into the first path so as to irradiate the workpiece held on the holding means with the condensed laser beam; dividing the laser beam reflected on the workpiece held on the holding means and guiding the divided laser beam into a second path different from the first path; intercepting the laser beam having the annular spot shape which is reflected on a lower surface of the work piece, on the second path, while permitting passage of the laser beam having the annular spot shape which is reflected on the upper surface of the workpiece; diffusing, on the second path, the laser beam having the annular spot shape which is reflected on the upper surface of the workpiece; detecting the intensity of the diffused laser beam by detection means having a detecting surface with a predetermined area; and calculating the height position of the upper surface of the workpiece held on the holding means, based on the detected intensity of the laser beam.

According to the height position detecting apparatus and the height position detecting method of the present invention, the laser beam having an annular spot shape with which a workpiece is irradiated is reflected in an annular spot shape on the upper surface of the workpiece, and, where the workpiece is transmissive to the laser beam, the laser beam is reflected also on the lower surface of the workpiece. In this case, the reflected light having the annular spot shape which is reflected on the lower surface of the workpiece is intercepted by the pinhole mask, whereas the reflected light having the annular spot shape which is reflected by the upper surface of the workpiece is permitted to pass through the pinhole mask, and the intensity of light received is detected based on the latter reflected light. Therefore, the height position of the upper surface of the workpiece can be detected even where the workpiece is transmissive to visible rays. In this case, with regard to the reflected light having the annular spot shape which is reflected on the upper surface of the workpiece, the intensity after diffusion by laser beam diffusing means is detected by the detection means having the detecting surface with a predetermined area. This makes it possible to detect assuredly and accurately the upper surface height position of the workpiece, even in the presence of a certain degree of scattering of the center position of the annular spot shape.

The above and other objects, features and advantages of the present invention and the manner of realizing them will become more apparent, and the invention thereof itself will best be understood from a study of the following description and appended claims with reference to the attached drawings showing some preferred embodiments of the invention.

BRIEF DESCRIPTION OF THE DRAWINGS

FIGS. 7A and 7B illustrate conditions where workpieces differing in thickness are irradiated with a laser beam;

FIG. 10 illustrates the size of the detecting surface and the like;

DETAILED DESCRIPTION OF THE PREFERRED EMBODIMENTS

Figure 1:
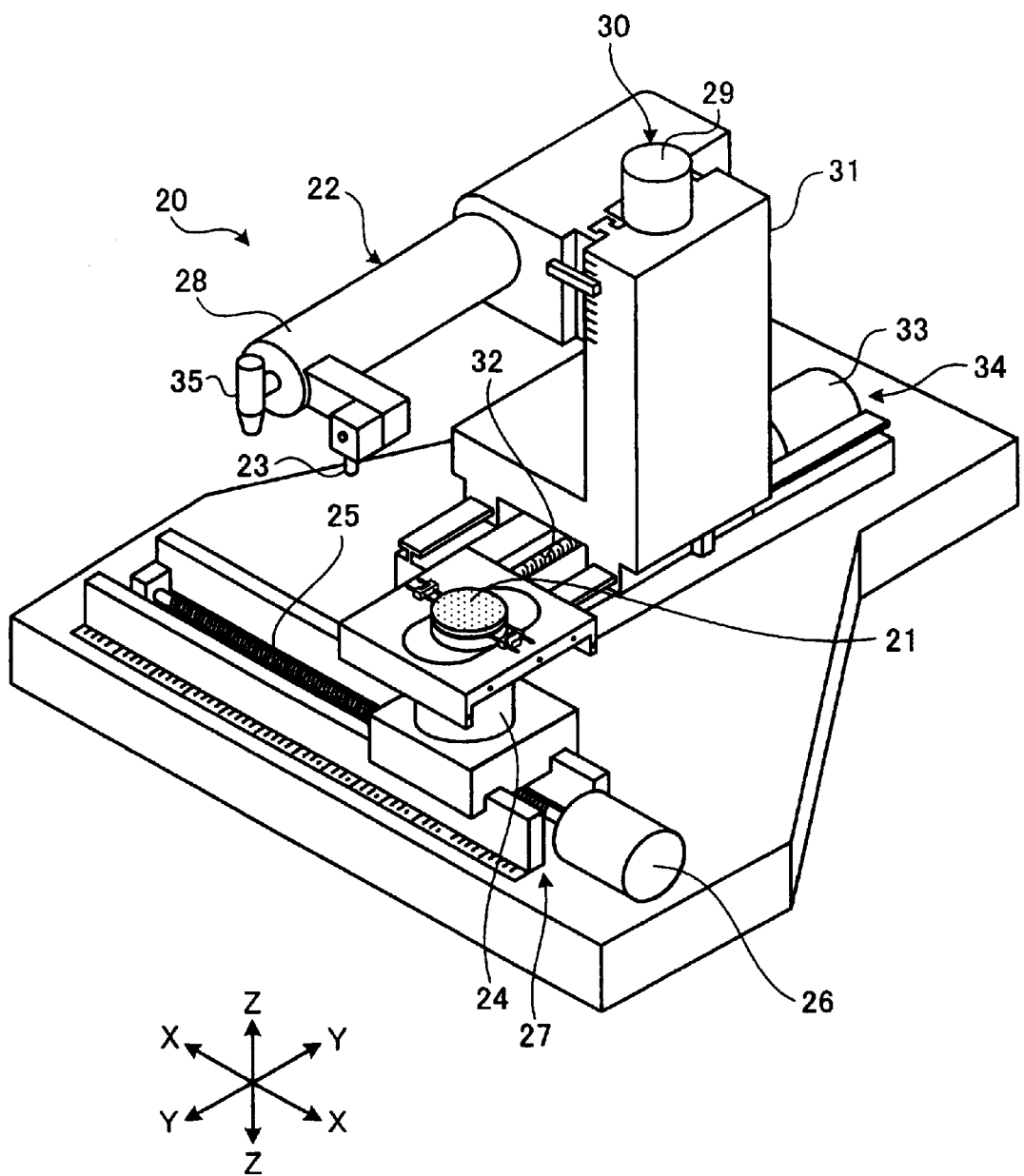
FIG. 1 is a perspective view showing a major part of a laser beam processing system to which a height position detecting apparatus and a height position detecting method according to an embodiment of the present invention are applied.

Now, a height position detecting apparatus and a height position detecting method according to a best mode for carrying out the present invention will be described below referring to the drawings. The present embodiment will be described with reference to an exemplary application of the invention to a height position detecting apparatus and a height position detecting method for use with a laser beam processing system by which a workpiece is irradiated with a pulsed laser beam along streets (planned cutting lines) corresponding to desired planned work positions while adjusting the focal point to the inside of the workpiece, to form an altered layer in the inside of the workpiece along the streets and to cut the workpiece along the streets.

FIG. 1 is a perspective view showing a major part of the laser beam processing system to which the height position detecting apparatus and the height position detecting method according to the present embodiment are applied. The laser beam processing system 20 used in this embodiment includes holding means 21 for holding workpiece W, laser beam irradiation means 22 for irradiating the workpiece W held on the holding means 21 with a pulsed laser beam having such a wavelength as to be transmissive to the workpiece W, and image pickup means 23 for picking up an image of the workpiece W held on the holding means 21. In addition, the holding means 21 holds the workpiece W by suction and is connected to a motor 24 so as to be rotatable. Besides, the holding means 21 is movable in an X-axis direction which is a horizontal direction by processing feeding means 27 composed of a ball screw 25, a nut (not shown), a pulse motor 26 and the like, whereby the workpiece W mounted on the holding means 21 is put into processing feed relative to the pulsed laser beam radiated from the laser beam irradiation means 22.

In addition, the laser beam irradiation means 22 includes a cylindrical casing 28 which is disposed substantially horizontally and through which the laser beam irradiation means 22 can be moved in an Z-axis direction by Z-axis moving means 30 composed of a ball screw (not shown), a nut (not shown), a pulse motor 29 and the like. Furthermore, the laser beam irradiation means 22 is provided to be movable in a Y-axis direction which is a horizontal direction by indexing feeding means 34 composed of the casing 28, a base 31 with the Z-axis moving means 30 mounted thereon, a ball screw 32, a nut (not shown), a pulse motor 33 and the like, whereby the laser beam irradiation means 22 is put into indexing feed relative to the workpiece W held on the holding means 21.

Here, pulsed laser beam oscillating means and the like which are not shown in the figure are disposed inside the casing 28. As the pulsed laser beam oscillating means, there is used, for example, a YVO4 pulsed laser beam oscillator or a YAG pulsed laser oscillator for oscillating a processing pulsed laser beam with a wavelength of 1064 nm. Besides, a condenser 35 accommodating a condenser lens (not shown) with a known configuration including a lens set or the like is mounted to a tip part of the casing 28.

In addition, the image pickup means 23 mounted to a tip part of the casing 28 is for picking up an image of the upper surface of the workpiece W held on the holding means 21 so as to detect the region to be processed by the pulsed laser beam radiated by way of the condenser 35 of the laser beam irradiation means 22. The image pickup means 23 includes an image sensor (CCD) for visible-ray image pickup or the like, and sends a picture signal of the picked-up image to control means which will be described later.

Figure 2:
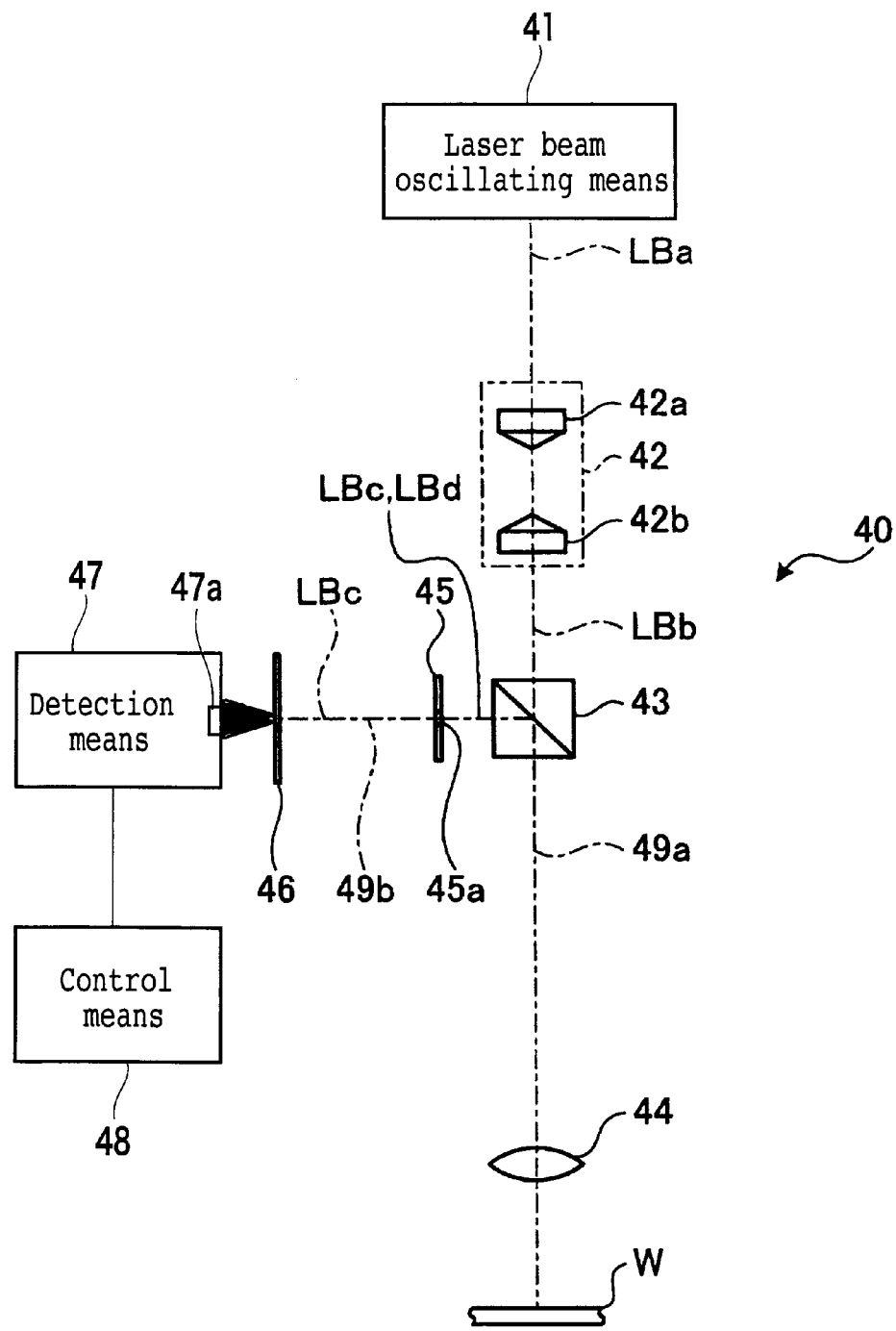
FIG. 2 is a schematic view showing a configuration example of the height position detecting apparatus.

The laser beam processing system 20 in this embodiment has a height position detecting apparatus 40 for detecting the height position of the upper surface of the workpiece W held on the holding means 21 by utilizing a part of the laser beam irradiation means 22. FIG. 2 is a schematic view showing a configuration example of the height position detecting apparatus 40. The height position detecting apparatus 40 includes laser beam oscillating means 41, annular spot forming means 42, a beam splitter 43, a condenser 44, a pinhole mask 45, laser beam diffusing means 46, detection means 47 and control means 48.

The laser beam oscillating means 41 is for oscillating a laser beam LBa having a wavelength different from the wavelength of the processing pulsed laser beam oscillated from the pulsed laser beam oscillating means (not shown) in the laser beam irradiation means 22. In the present embodiment, for example, a CW laser source for oscillating a laser beam LBa with a wavelength of 635 nm, a beam diameter of 1 mm and an output of 5 mW is used.

Besides, the annular spot forming means 42 is for conversion by which the laser beam LBa oscillated by the laser beam oscillating means 41 and having a Gaussian (circular) spot shape (cross-sectional shape) is converted into a laser beam LBb having an annular (doughnut-like) spot shape (cross-sectional shape). In the present embodiment, the annular spot forming means 42 is composed of a pair of conical lenses 42a and 42b arranged in series with each other at a predetermined interval along the optical path of the laser beam LBa. Incidentally, while the pair of conical lenses 42a and 42b are arranged with their vertexes facing each other, they may be arranged back to back or be arranged in the same orientation.

The beam splitter 43 includes, for example, a polarization beam splitter and a quarter-wave plate. The beam splitter 43 is for transmitting therethrough a laser beam LBb with a spot shape formed to be annular by the annular spot forming means 42, to guide the laser beam LBb into a first path 49a, while reflecting a reflected beam from the workpiece W side as described later, to guide the reflected beam into a second path 49b different from the first path 49a.

In addition, the condenser 44 includes a condenser lens for condensing the laser beam LBb guided into the first path 49a by the beam splitter 43 and having a spot shape formed to be annular, so as to irradiate the workpiece W held on the holding means 21 with the condensed laser beam. Here, in the present embodiment, the condenser lens that is provided in the condenser 35 and composed of a known configuration including a lens set or the like for use in the laser beam irradiation means 22 is used also as the condenser lens in the condenser 35. For this purpose, a dichroic half mirror (not shown) for separation between the laser beam path from the pulsed laser beam oscillating means for the laser beam irradiation means 22 and the laser beam path from the laser beam oscillating means 41 by the combined use of the condenser 44 (condenser 35) is provided on a path between the beam splitter 43 and the condenser 44 (condenser 35).

The pinhole mask 45, provided with a pinhole 45a for restricting the passage of a reflected beam having a diameter of larger than a predetermined value, is disposed on the second path 49b for the purpose of intercepting the reflected beam from the lower surface of the workpiece W of the reflected beams so that the reflected beam from the upper surface of the workpiece W and the reflected beam from the lower surface of the workpiece W are spatially separated from each other. The pinhole 45a is set to have a diameter of 1 mm, for example.

The laser beam diffusing means 46 is for diffusing the laser beam with the annular spot shape having passed through the pinhole 45a in the pinhole mask 45, and is disposed on the second path. Such laser beam diffusing means 46 includes a ground glass, an opal light diffusion glass, a holographic diffuser or the like. The detection means 47 includes a photodetector having a detecting surface 47a with a predetermined area and disposed on the second path 49b at a substantially central position of the annular spot of the laser beam, and serves for receiving the laser beam diffused by the laser beam diffusing means 46 and for measuring the amount of light received, to thereby detect the intensity of the laser beam received.

Figure 3:
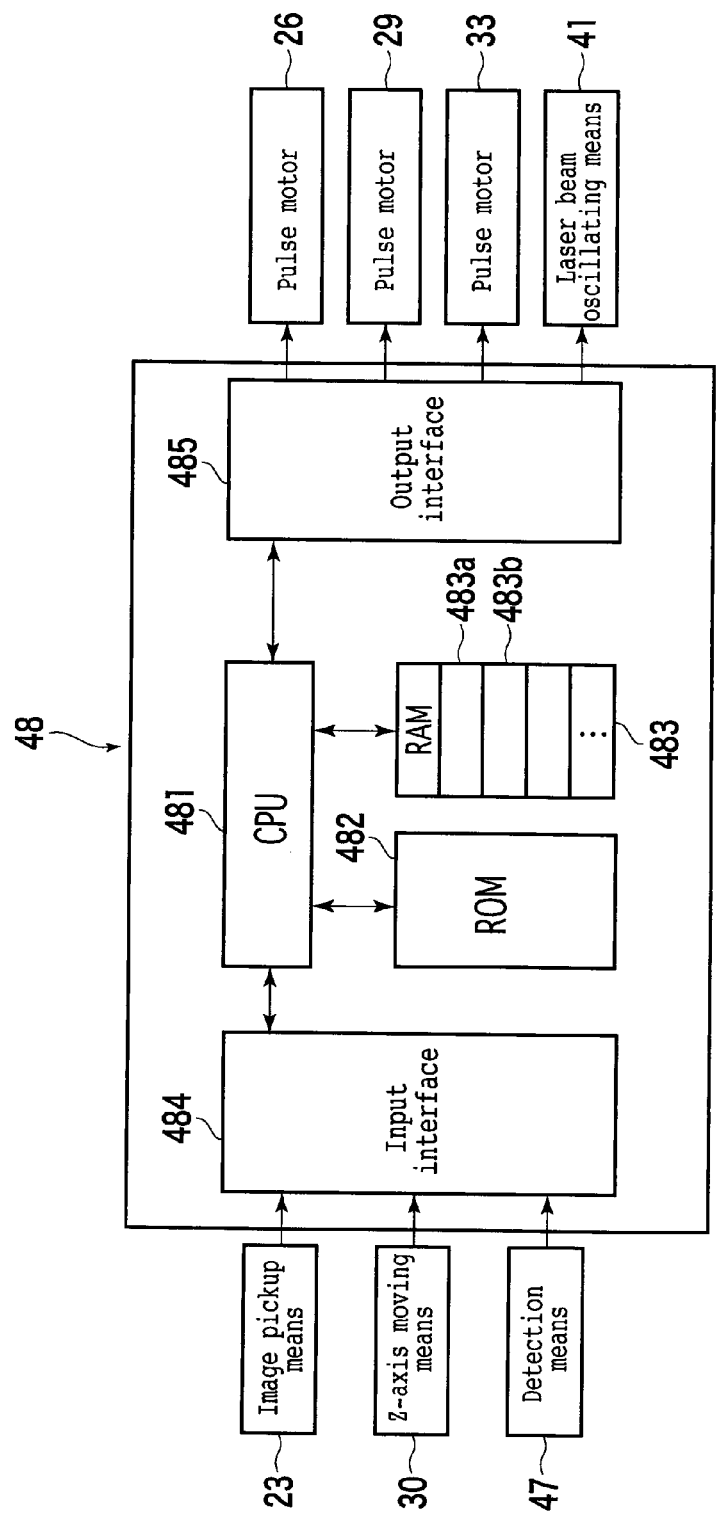
FIG. 3 is a schematic block diagram showing a configuration example of control means and the surroundings thereof.
Figure 11:
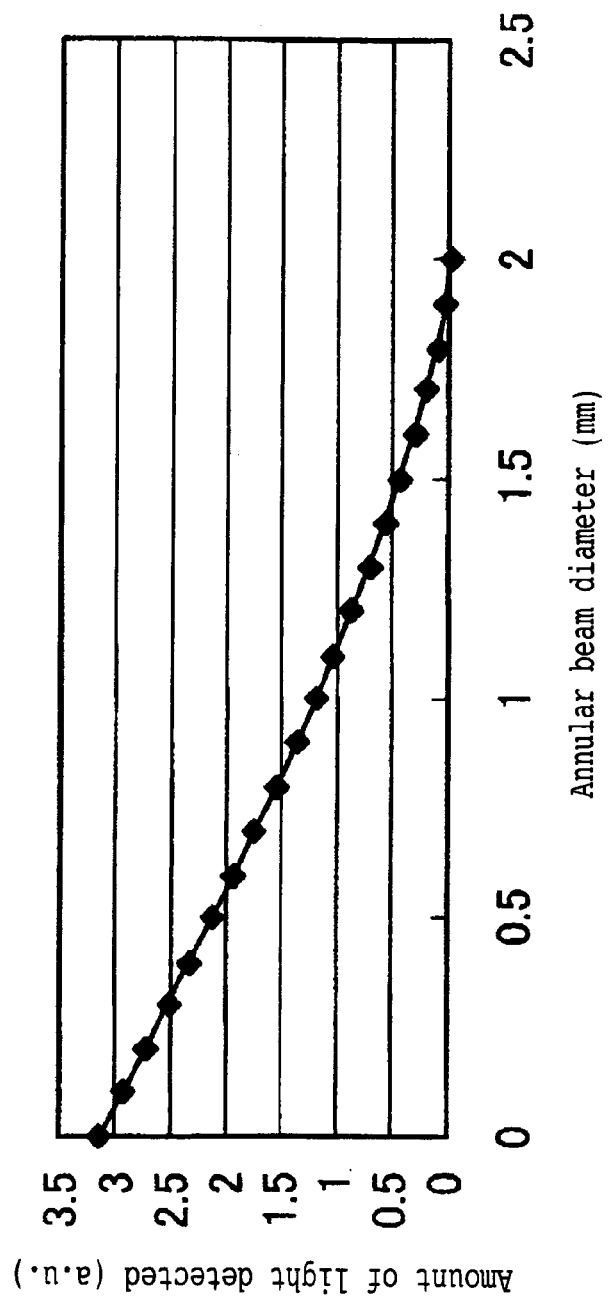
FIG. 11 is a characteristic diagram showing an example of the amount of light detected by the detection means.

FIG. 3 is a schematic block diagram showing a configuration example of the control means 48 and the surroundings thereof. The control means 48 includes a computer having a CPU 481 for executing arithmetic processes according to a control program stored in a ROM 482, and functions to control the laser beam processing system 20 as a whole and to execute a process by which the height position of the upper surface of the workpiece W held on the holding means 21 is calculated based on the intensity of the reflected light detected by the detection means 47. The control means 48 further comprises a RAM 483 for storing calculation results and the like, an input interface 484, and an output interface 485. To the input interface 484, detection signals from the image pickup means 23, the Z-axis moving means 30, the detection means 47 and so on are inputted. Besides, from the output interface, control signals are outputted to the pulse motors 26, 29, 33, the laser beam oscillating means 41 and the like. Incidentally, the RAM 483 has a storage area 483a for storing data indicative of the relation between the beam diameter and the amount of light detected as shown in FIG. 11 below for calculating the height position of the upper surface of the workpiece W, a storage area 483b for storing information on the coordinates on the workpiece W and so on, and other storage areas.

Figure 4:
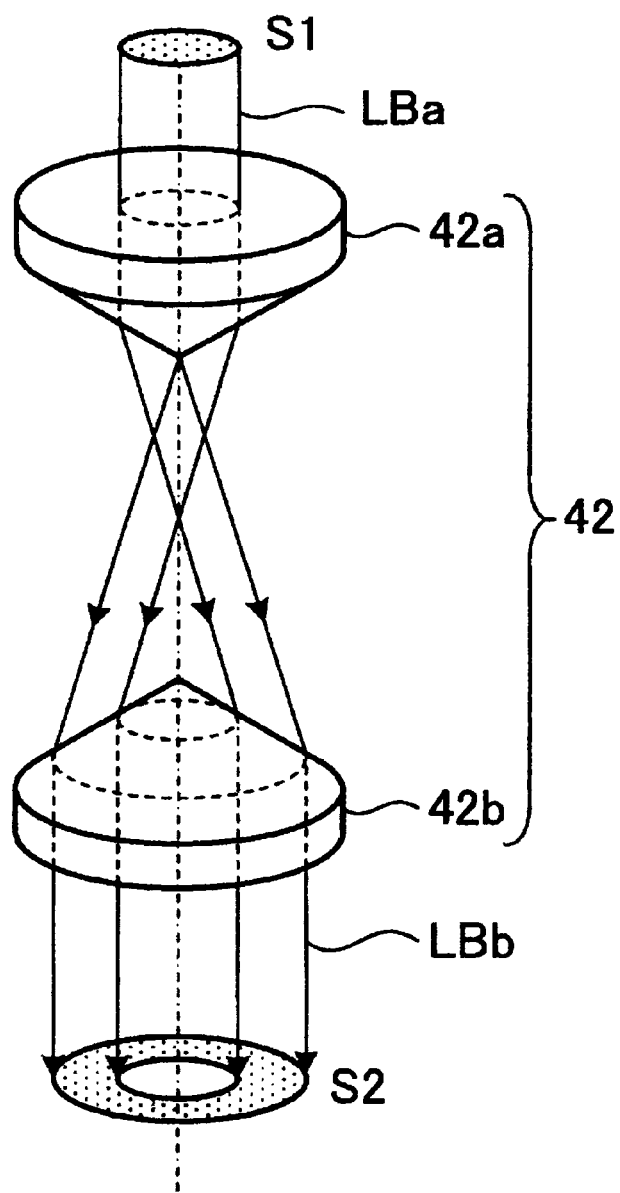
FIG. 4 illustrates a condition where an annular spot is formed by annular spot forming means.

The operation of the height position detecting apparatus 40 having such a configuration will be described. FIG. 4 illustrates a condition where an annular spot is formed by the annular spot forming means 42. First, as shown in FIG. 4, the laser beam LBa having a circular spot shape S1 which is oscillated from the laser beam oscillating means 41 is converted by the annular spot forming means 42 into the laser beam LBb having an annular spot shape S2. Specifically, the annular spot forming means 42 expands the laser beam LBa having a diameter of 2 mm into the annular laser beam LBb having, for example, an outer diameter of 10 mm and an inner diameter of 8 mm, and forms a collimated beam. The laser beam LBb formed into the annular spot shape S2 by the annular spot forming means 42 is, as shown in FIG. 2, guided into the first path 49a by the beam splitter 43 and condensed to the workpiece W by the condenser 44.

Figure 5:
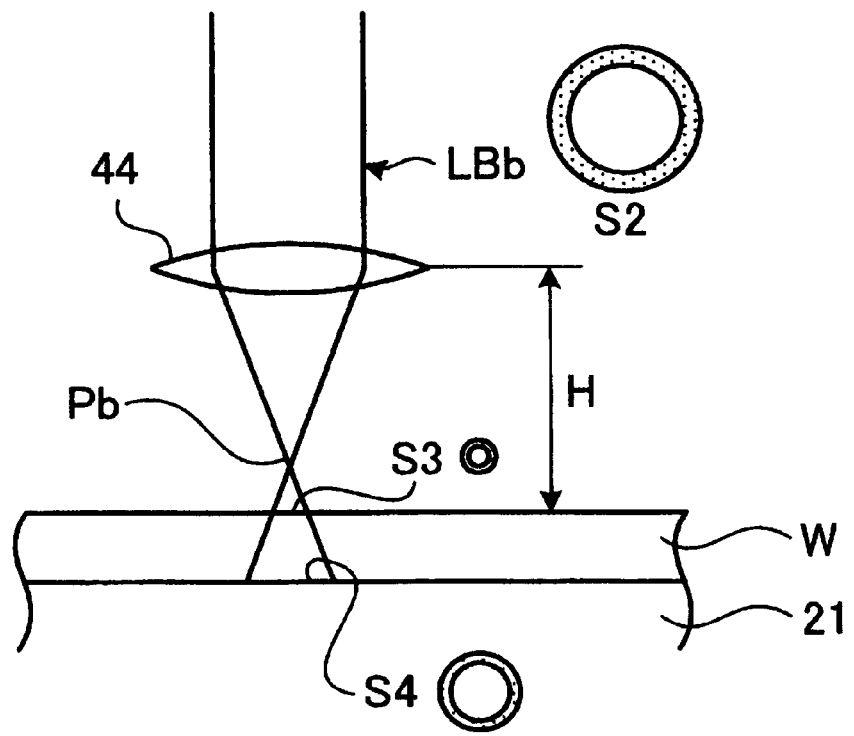
FIG. 5 illustrates a condition where a workpiece is irradiated with a laser beam having an annular spot shape.

In the case where the laser beam LBb formed into the annular spot shape S2 is thus served for irradiation of the upper surface of the workpiece W held on the holding means 21, the Z-axis moving means 30 is operated for a control such that the converging point Pb is positioned on the upstream side (upper side) of the upper surface of the workpiece W in the laser beam irradiation direction, as shown in FIG. 5. FIG. 5 illustrates a condition where the workpiece is irradiated with a laser beam having an annular spot shape. As a result, the laser beam LBb formed into the annular spot shape S2 is radiated in the annular spot shape S3 onto the upper surface of the workpiece W held on the holding means 21, and is reflected in the size of the annular spot shape S3 (first reflected beam). In this instance, where the workpiece W is formed of sapphire or quartz or the like which is transmissive to the laser beam LBb, the laser beam LBb is transmitted through the workpiece W to reach the lower surface of the latter, and is reflected in the size of the annular spot shape S4 (second reflected beam).

Figure 6:
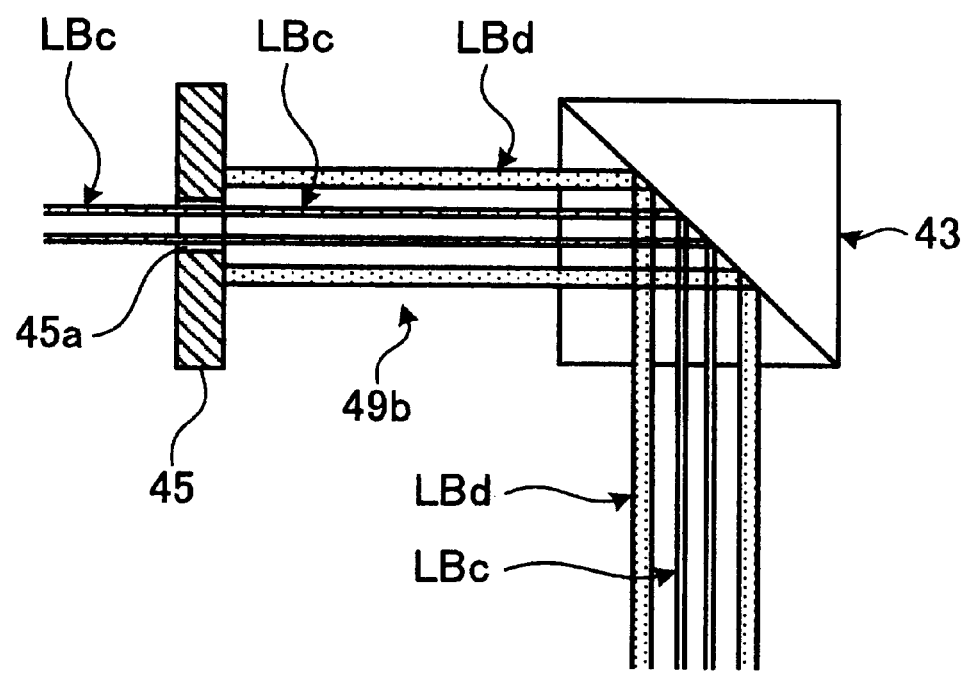
FIG. 6 illustrates a condition where each of laser beams is intercepted or permitted to pass by a pinhole mask.

The first reflected beam with the annular spot shape S3 thus reflected on the upper surface of the workpiece W and the second reflected beam with the annular spot shape S4 thus reflected on the lower surface of the work piece W reach the beam splitter 43 by way of the condenser 44. FIG. 6 illustrates a condition where each of the laser beams is intercepted or permitted to pass by the pinhole mask. As shown in FIG. 6, the first reflected beam LBc with the annular spot shape S3 and the second reflected beam LBd with the annular spot shape S4 which have reached the beam splitter 43 are reflected by the beam splitter 43 and thereby guided into the second path 49b, to reach the pinhole mask 45. The pinhole 45a formed in the pinhole mask 45 is, in this embodiment, set to have a diameter of 1 mm, for example, so that the first reflected beam LBc with the annular spot shape S3 passes through the pinhole mask 45 whereas the second reflected beam LBd with the annular spot shape S4 is intercepted by the pinhole mask 45. Incidentally, the diameter of the pinhole 45a is set to such a value that the first reflected beam LBc with the annular spot shape S3 is permitted to pass whereas the second reflected beam LBd with the annular spot shape S4 is intercepted, taking into account the thickness of the workpiece W, the position of the converging point Pb, and the like.

Thus, the second reflected beam LBd with the annular spot shape S4 reflected on the lower surface of the workpiece W is intercepted by the pinhole mask 45, and only the first reflected beam LBc with the annular spot shape S3 reflected on the upper surface of the workpiece W is permitted to pass through the pinhole 45a in the pinhole mask 45.

Here, the diametral size of the first reflected beam LBc with the annular spot shape S3 reflected on the upper surface of the workpiece W varies depending on the height position of the upper surface of the workpiece W irradiated with the laser beam LBb. FIGS. 7A and 7B illustrate conditions where workpieces different in thickness are irradiated with the laser beam. For example, in the case where the height position of the upper surface of the workpiece W is high (the thickness of the workpiece W is large) and the distance H from the condenser 44 to the upper surface of the workpiece W is small as shown in FIG. 7A, the laser beam LBb is reflected in the size of an annular spot shape S3a at the time of irradiation of the upper surface of the workpiece W therewith. This annular spot shape S3a is comparatively small in size. On the other hand, in the case where the height position of the upper surface of the workpiece W is low (the thickness of the workpiece W is small) and the distance H from the condenser 44 to the upper surface of the workpiece W is large as shown in FIG. 7B, the laser beam LBb is reflected in the size of an annular spot shape S3b at the time of irradiation of the upper surface of the workpiece W therewith. The annular spot shape S3b is larger in diameter than the above-mentioned annular spot shape S3a.

In this manner, the diameter of the first reflected beam LBc with the annular spot shape S3 reflected on the upper surface of the workpiece W is smaller as the distance H from the condenser 44 to the upper surface of the workpiece W is smaller, and the diameter is larger as the distance H from the condenser 44 to the upper surface of the workpiece W is larger. Therefore, by detecting the magnitude of the diameter of the first reflected beam LBc with the annular spot shape reflected on the upper surface of the workpiece W, it is possible to determine the height position of the upper surface of the workpiece W.

Taking this into consideration, in the height position detecting apparatus 40 according to the present embodiment, the diametral size of the first reflected beam LBc having the annular spot shape S3 which is reflected on the upper surface of the workpiece W is detected by use of the laser beam diffusing means 46 and the detection means 47, and, based on the detection results, the height position of the upper surface of the workpiece W is determined by the control means 48.

Figure 8:
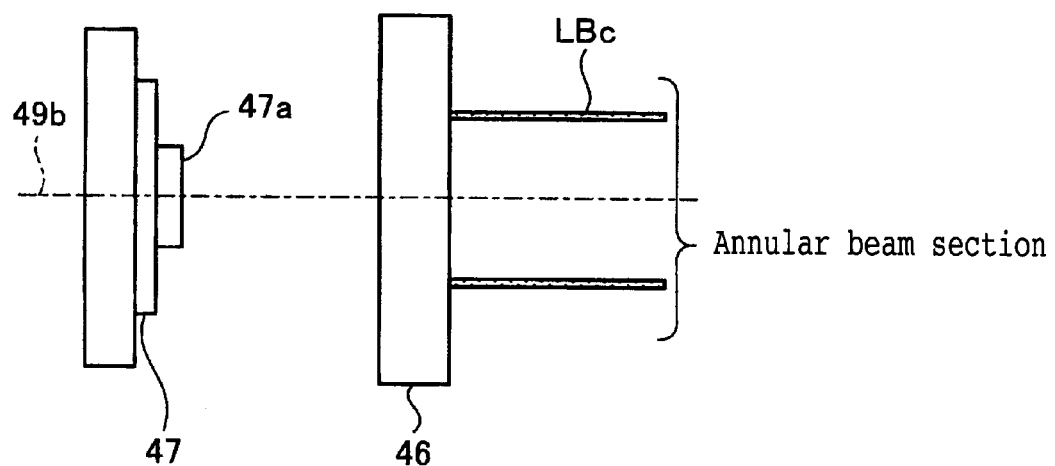
FIG. 8 is a principle diagram showing, in enlarged form, laser beam diffusing means and detection means.

FIG. 8 is a principle diagram showing, in enlarged form, the laser beam diffusing means 46 and the detection means 47. The first reflected beam LBc having the annular spot shape S3 which is reflected on the upper surface of the workpiece W is scattered by passage through the laser beam diffusing means 46, and the amount of light incident on the detecting surface 47a of the detection means 47 disposed on the center axis of the annular spot is measured, thereby to obtain a signal proportional to the beam diameter of the annular spot shape S3.

Specifically, the first reflected beam LBc with the annular spot shape S3 which has passed through the laser beam diffusing means 46 travels toward the detection means 47 side while being increased in annular spot diameter at a specified angle of divergence. Then, the amount of light received and detected by the detecting surface 47a having a predetermined area of the detection means 47 conforms to the proportion of the detecting surface 47a based on the irradiation area of the diverged annular spot as a whole. Accordingly, it can be said that the amount of light detected by the detecting surface 47a is:

(a) larger as the detecting surface 47a is closer to the laser beam diffusing means 46; and (b) larger as the beam diameter of the annular spot shape S3 is smaller.

Figure 9A:
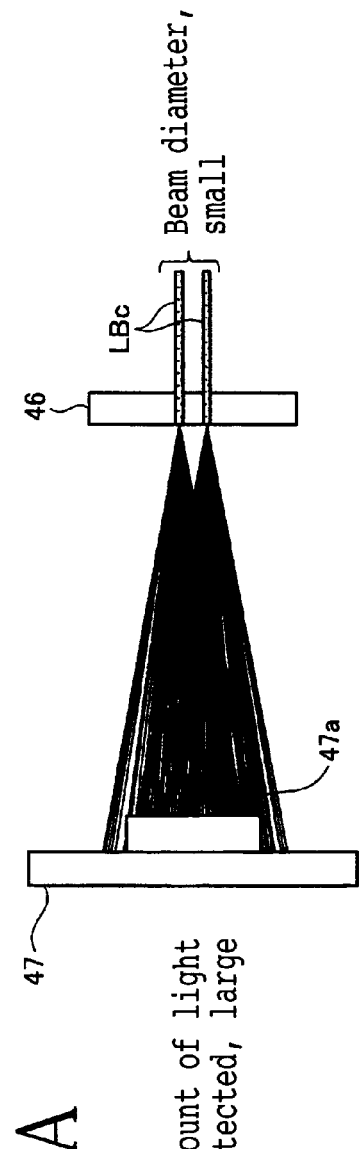
FIGS. 9A and 9B are principle diagrams which show the magnitude of the amount of light detected at a detecting surface, depending on a difference in the beam diameter of a laser beam having an annular spot shape.
Figure 9B:
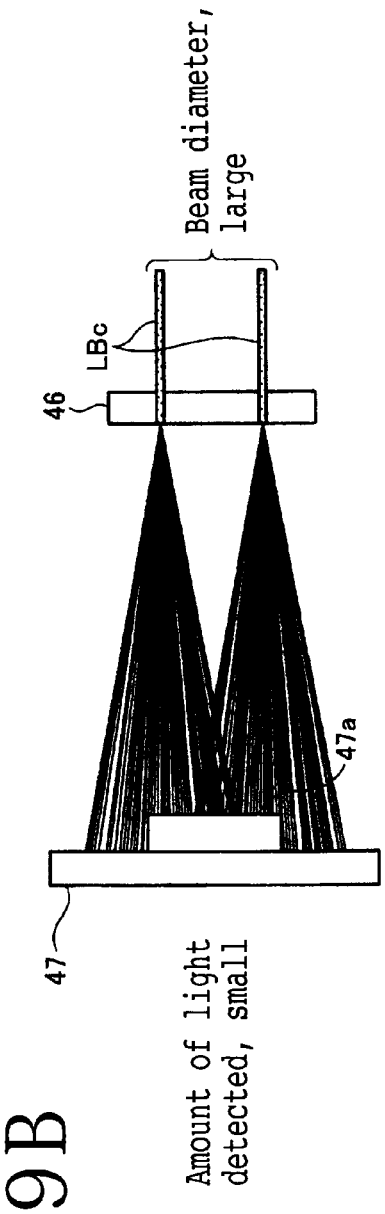

FIGS. 9A and 9B are principle diagrams which show the magnitude of the amount of light detected at the detecting surface 47a, depending on the magnitude of the beam diameter of the annular spot shape S3. It is seen that as the beam diameter of the annular spot shape S3 is smaller, the amount of rays overlapping with each other on the detecting surface 47a after scattering by the laser beam diffusing means 46 increases and the amount of light detected at the detecting surface 47a becomes larger. On the other hand, it is seen, as the beam diameter of the annular spot shape S3 is larger, the amount of rays overlapping with each other on the detecting surface 47a after scattering by the laser beam diffusing means 46 decreases and the amount of light detected at the detecting surface 47a becomes smaller. Therefore, with the position of the detecting surface 47a fixed, a signal proportional to the beam diameter of the annular spot shape S3 can be obtained.

Figure 10:
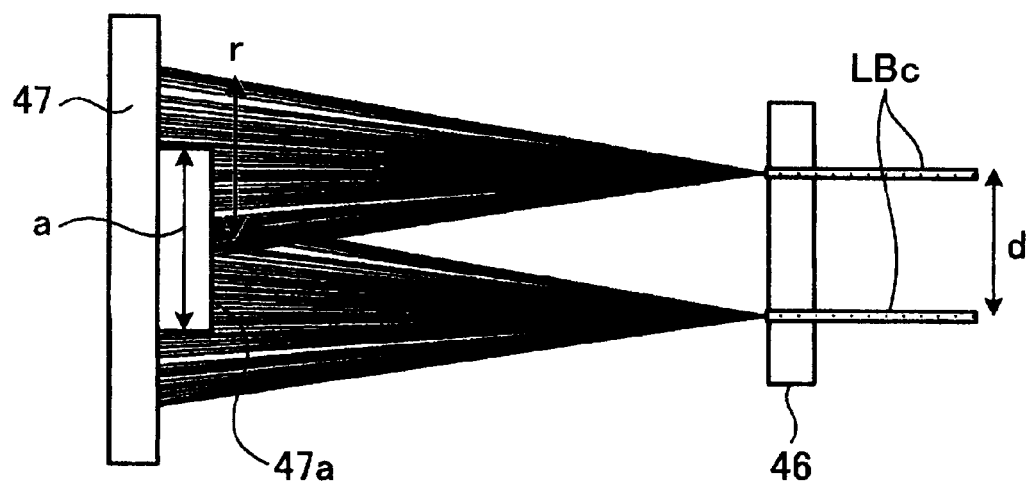

Here, an example of the amount of light detected by the detection means 47 in the height position detecting apparatus 40 according to this embodiment is shown in FIG. 11. Incidentally, FIG. 10 illustrates the size of the detecting surface and the like. As shown in FIG. 10, in this measurement example, the detection means 47 has a detecting surface 47a with a diameter a=1 mm and it is disposed at such a position that the width of scattered light with the annular spot shape S3 (the diameter r of the annular spot upon arrival at the detecting surface 47a) is 1 mm. According to the measurement example shown in FIG. 11, the amount of light detected at the detecting surface 47a is seen to decrease linearly with an increase in the beam diameter d of the annular spot shape S3. Therefore, it is possible to calculate the beam diameter d of the annular spot shape S3 by the control means 48 on the basis of the amount of light (intensity) detected by the detection means 47, and to detect the height position of the upper surface of the workpiece W on the basis of the beam diameter d.

Thus, according to the height position detecting apparatus 40 in this embodiment, the laser beam with the annular spot shape serving for irradiating the workpiece W therewith is reflected in an annular spot shape on the upper surface of the workpiece W, and, where the workpiece W is transmissive to the laser beam, the laser beam is also reflected in an annular spot shape on the lower surface of the workpiece W. In this case, it is to be noted that the reflected light having the annular spot shape which is reflected on the lower surface of the workpiece W is intercepted by the pinhole mask 45, and the intensity of light received is detected based on the reflected light having the annular spot shape which is reflected on the upper surface of the workpiece W and permitted to pass through the pinhole 45a in the pinhole mask 45. Therefore, the height position of the upper surface of the workpiece W can be detected even in the case where the workpiece W is transmissive to visible rays. In this case, since the intensity, after diffusion by the laser beam diffusing means 46, of the reflected light having the annular spot shape which is reflected on the upper surface of the workpiece W is detected by the detection means 47 having the detecting surface 47a with a predetermined area, the upper surface height position of the workpiece W can be detected assuredly and accurately even in the presence of a certain degree of scattering of the center position of the annular spot shape (even in the presence of collapse or deformation of the annular spot shape).

Figure 12:
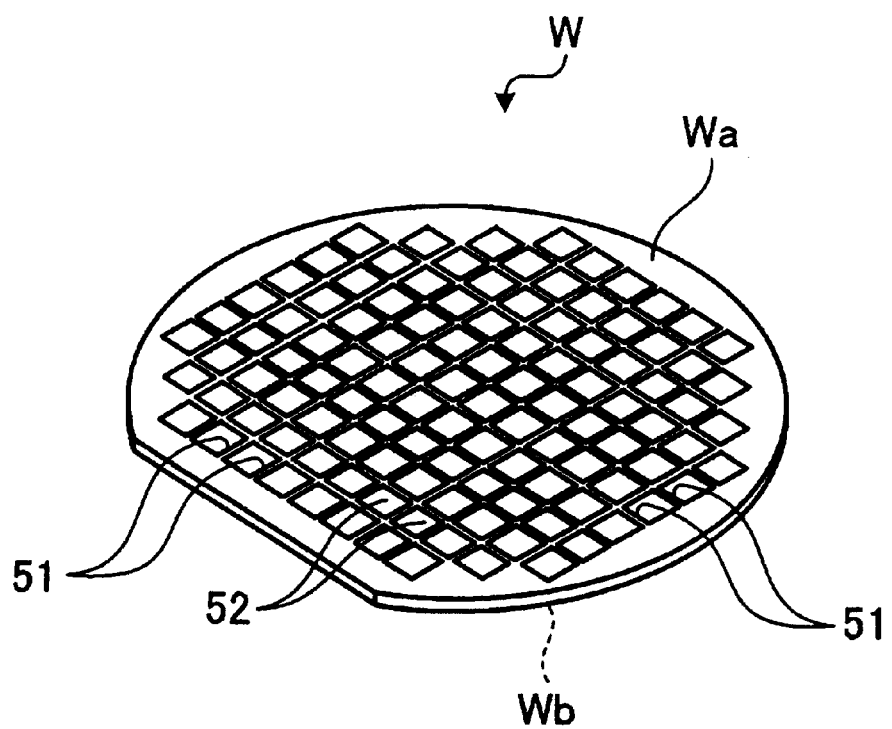
FIG. 12 is a perspective view showing a configuration example of a workpiece used in the laser beam processing system.

Now, the operation of a laser beam processing system 10 having the height position detecting apparatus as above will be described below. FIG. 12 is a perspective view showing a configuration example of the workpiece W used in the laser beam processing system 10. The workpiece W is not particularly limited; in this embodiment, for example, a workpiece formed of a material which is transmissive to visible rays, such as sapphire or quarts, is used. For instance, a sapphire workpiece W has a plurality of rectangular regions demarcated by a plurality of streets 51 formed in a grid pattern on a surface Wa thereof, and optical devices 52 such as light emitting diodes and laser diodes are formed in the thus demarcated rectangular regions.

In view of the above, description will be made of a case where laser processing for irradiating the workpiece W with a pulsed laser beam along the streets 51 so as to form an altered layer in the inside of the workpiece W along the streets 51 is performed by use of the laser beam processing system 10. Incidentally, in forming the altered layer in the inside of the workpiece 10, the presence of scattering of the thickness of the workpiece W would make it impossible to form the altered layer uniformly at a predetermined depth position, due to a problem relating to refractive index as above-mentioned. Taking this into account, in this embodiment, the upper surface height position of the workpiece W held on the holding means 21 is detected by the above-mentioned height position detecting apparatus 40, and, while adjusting the Z-axis position of the Z-axis moving means 30 according to the detection results, the laser processing is simultaneously carried out by the laser beam irradiation means 22. Specifically, the workpiece W is scanned while irradiating the workpiece W simultaneously with both a pulsed laser beam for processing by the laser beam irradiation means 22 and a laser beam for detection by the height position detecting apparatus 40.

First, the workpiece W is mounted on the holding means 21, with its back-side surface Wb up, and the workpiece W is held on the holding means 21 by suction. The holding means 21 with the workpiece W held thereon by suction is positioned into a position just under the image pickup means 23 by the processing feeding means 27. After the holding means 21 is positioned into the position just under the image pickup means 23, an alignment work for detecting a work region to be laser beam processed of the workpiece W is carried out by the image pickup means 23 and the control means 48. More specifically, the image pickup means 23 and the control means 48 perform the alignment work by carrying out image processings such as pattern matching for obtaining an image of the street 51 formed in a predetermine direction on the workpiece W and for matching the position of the condenser 35 (and, therefore, the condenser 44 of the height position detecting apparatus 40 for detecting the height position of the workpiece W) along the street 51.

Figure 13A:
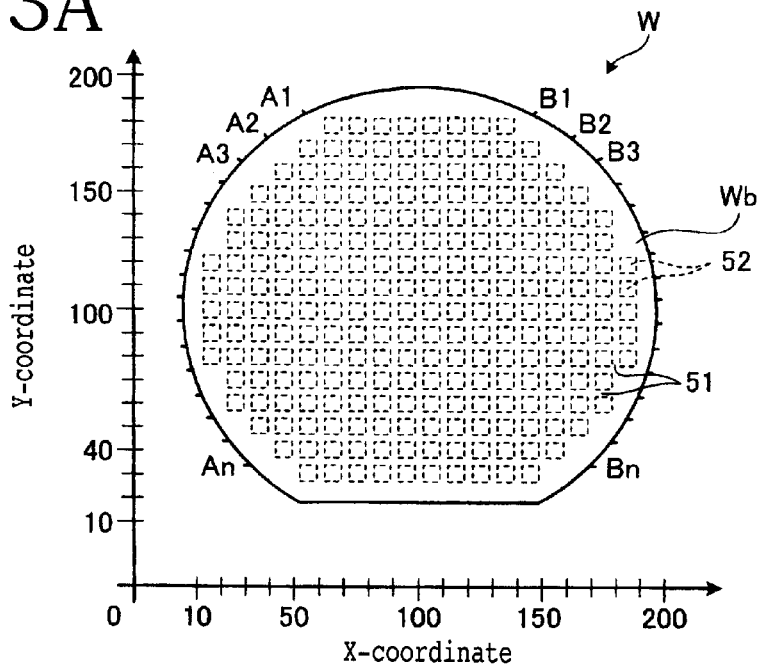
FIGS. 13A and 13B each illustrate the relation of the work piece, held in a predetermined position of holding means, with coordinate positions.
Figure 13B:
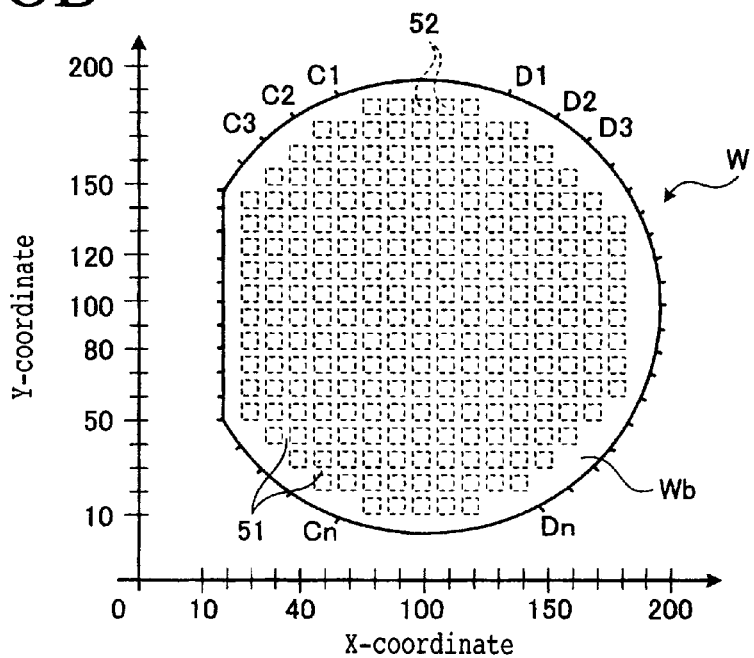

When the alignment is thus conducted, the workpiece W on the holding means 21 is in the state of being positioned in a coordinate position as shown in FIG. 13A. FIGS. 13A and 13B each illustrate the relation of the workpiece W, held in a predetermined position of the holding means 21, with the coordinate positions. Incidentally, FIG. 13B shows the condition obtained by rotating the holding means 21, and hence the work piece W, through 90 degrees from the condition shown in FIG. 13A.

Incidentally, feed starting position coordinate values (A1, A2, A3, . . . , An) and feed finishing position coordinate values (B1, B2, B3, . . . , Bn) and feed starting position coordinate values (C1, C2, C3, . . . , Cn) and feed finishing position coordinate values (D1, D2, D3, . . . , Dn) of each of the streets 51 formed on the workpiece W in the state of being positioned in each of the coordinate positions shown in FIGS. 13A and 13B are stored in the storage area 483b of the RAM 483.

Figure 14:
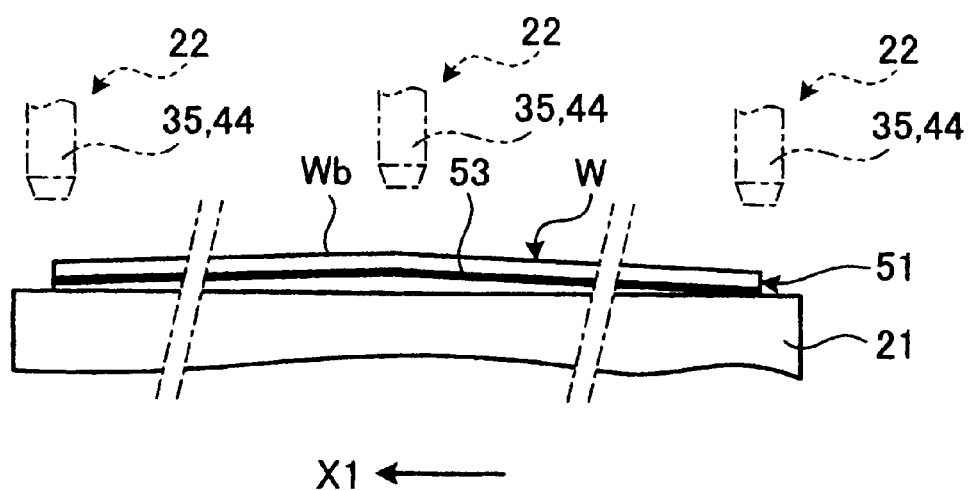
FIG. 14 illustrates a height position detecting step and a laser beam processing step for forming an altered layer.

After the streets 51 formed on the workpiece W held on the holding means 21 are detected and the alignment of the laser beam processing position is carried out, the holding means 21 is moved to position the uppermost one of the streets 51 into the position just under the condenser 44. FIG. 14 illustrates a height position detecting step and a laser beam processing step for forming an altered layer. Further, as shown in FIG. 14, the feed starting position coordinate value A1 which is one end (in FIG. 14, the left end) of the street 51 is positioned into the position just under the condenser 44 (which simultaneously is the condenser 35). Then, the height position detecting apparatus 40 is operated, and the holding means 21 is moved at a predetermined processing feed rate in the direction of arrow X1 in FIG. 14 to the feed finishing position coordinate value B2. As a result, the height position (the distance H from the condenser 44 to the upper surface (backside surface Wb) of the workpiece W) at the uppermost street 51 in FIG. 13A of the workpiece W is detected sequentially.

The control means 48 thus executes a height position detecting process along the street 51 (corresponding to the work portion to be processed) formed on the workpiece W. In addition, the control means 48 performs feedback control of the pulse motor 29 of the Z-axis moving means 30, based on the detection results of the height position detected sequentially. While adjusting the height position of the converging point Pa of the pulsed laser beam radiated by way of the condenser 35, the laser beam processing for forming the altered layer in the inside of the workpiece W along the street 51 is carried out. In short, the control means 48 performs feedback control of the pulse motor 29 in the Z-axis moving means 30 on the basis of the detection results obtained by the height position detecting apparatus 40, whereby the condenser 35 is moved in the vertical direction according to the height position detected at the street 51 of the workpiece W, as shown in FIG. 14.

As a result, the converging point Pa of the pulsed laser beam radiated by way of the condenser 35 is adjusted to a predetermined depth position from the back-side surface Wb (upper surface) of the workpiece W, and, as shown in FIG. 14, the altered layer 53 is formed in the inside of the workpiece W at a predetermined depth position from the back-side surface Wb (upper surface) of the workpiece W and in parallel to the back-side surface Wb. When the irradiation position of the condenser 35 reaches the other end (in FIG. 14, the right end) of the street 51, as shown in FIG. 14, the radiation of the pulsed laser beam is stopped, and the movement of the holding means 21 is stopped.

After the height position detecting operation and the laser beam processing operation as above-described are carried out along all the streets 51 extending in a predetermined direction on the workpiece W in the above-mentioned manner, the holding means 21 is rotated by 90 degrees, and the height position detecting operation and the laser beam processing operation are similarly carried out along each of the streets 51 extending in the direction orthogonal to the predetermined direction. After the height position detecting operation and the laser beam processing operation are thus carried out along all the streets 51 formed on the workpiece W, the holding means 21 holding the workpiece W is returned to the position where the workpiece W has initially been held on suction, and the suction holding of the workpiece W is released in this position. Then, the workpiece W is fed to a dividing step by feeding means (not shown).

The present invention is not limited to the above-described embodiment, and various modifications are possible within the scope of the gist of the present invention. For example, while an application example of the present invention to a height position detecting apparatus 40 and a height position detecting method in a laser beam processing system 20 has been described in the embodiment above, the invention is applicable to a variety of processing apparatuses for processing a workpiece held on holding means.

What is claimed is:

1. A height position detecting apparatus for detecting a height position of an upper surface of a workpiece which is transmissive to visible light and held on holding means, comprising:

laser beam oscillating means for oscillating a laser beam;
   annular spot forming means for forming a spot shape of the laser beam oscillated by the laser beam oscillating means into an annular shape;
   a beam splitter for guiding into a first path the laser beam with the annular spot shape formed to be annular by the annular spot forming means;
   a condenser for condensing the laser beam guided into the first path so as to irradiate at least the upper surface of the workpiece held on the holding means with the condensed laser beam;
   a pinhole mask disposed in a second path into which the laser beam reflected on the workpiece held on the holding means is dividedly guided by the beam splitter, the pinhole mask permitting therethrough passage of the laser beam reflected on the upper surface of the workpiece and blocking the laser beam reflected on a lower surface of the workpiece;
   diffusing means for diffusing the laser beam, the diffusing means being disposed on the second path at a position on a downstream side relative to the pinhole mask;
   detection means having a detecting surface with a predetermined area for detecting the intensity of the laser beam diffused by the laser beam diffusing means, the detection means being disposed at a substantially central position of the annular spot of the laser beam; and
   control means for calculating the height position of the upper surface of the workpiece held on the holding means, based on the intensity of the reflected light detected by the detection means.

2. The height position detecting apparatus according to claim 1, wherein the annular spot forming means includes a pair of conical lenses arranged in series with each other at predetermined intervals along an optical path of the laser beam.

3. A method of detecting a height position of an upper surface of a workpiece which is transmissive to visible light and held on holding means, the detection being performed by use of a laser beam, the method comprising the steps of:

oscillating a laser beam;
   forming a spot shape of the oscillated laser beam into an annular shape;
   guiding the laser beam with the spot shape formed to be annular into a first path;
   condensing the laser beam guided into the first path so as to irradiate at least the upper surface of the workpiece held on the holding means with the condensed laser beam;
   dividing the laser beam reflected on the workpiece held on the holding means and guiding the divided laser beam into a second path different from the first path;
   intercepting the laser beam having the annular spot shape which is reflected on a lower surface of the work piece, on the second path, while permitting passage of the laser beam having the annular spot shape which is reflected on the upper surface of the workpiece;
   diffusing, on the second path, the laser beam having the annular spot shape which is reflected on the upper surface of the workpiece;
   detecting the intensity of the diffused laser beam by detection means having a detecting surface with a predetermined area; and
   calculating the height position of the upper surface of the workpiece held on the holding means, based on the detected intensity of the laser beam.

4. The method of detecting a height position of an upper surface of a workpiece according to claim 3, wherein the workpiece is formed of sapphire or quartz.

5. The height position detecting apparatus according to claim 1, wherein the workpiece is formed of sapphire or quartz.

\* \* \* \* \*